Dec. 25, 1951 A. ABGARIAN 2,580,267
MOWER MOUNTING
Filed April 29, 1946 4 Sheets-Sheet 1
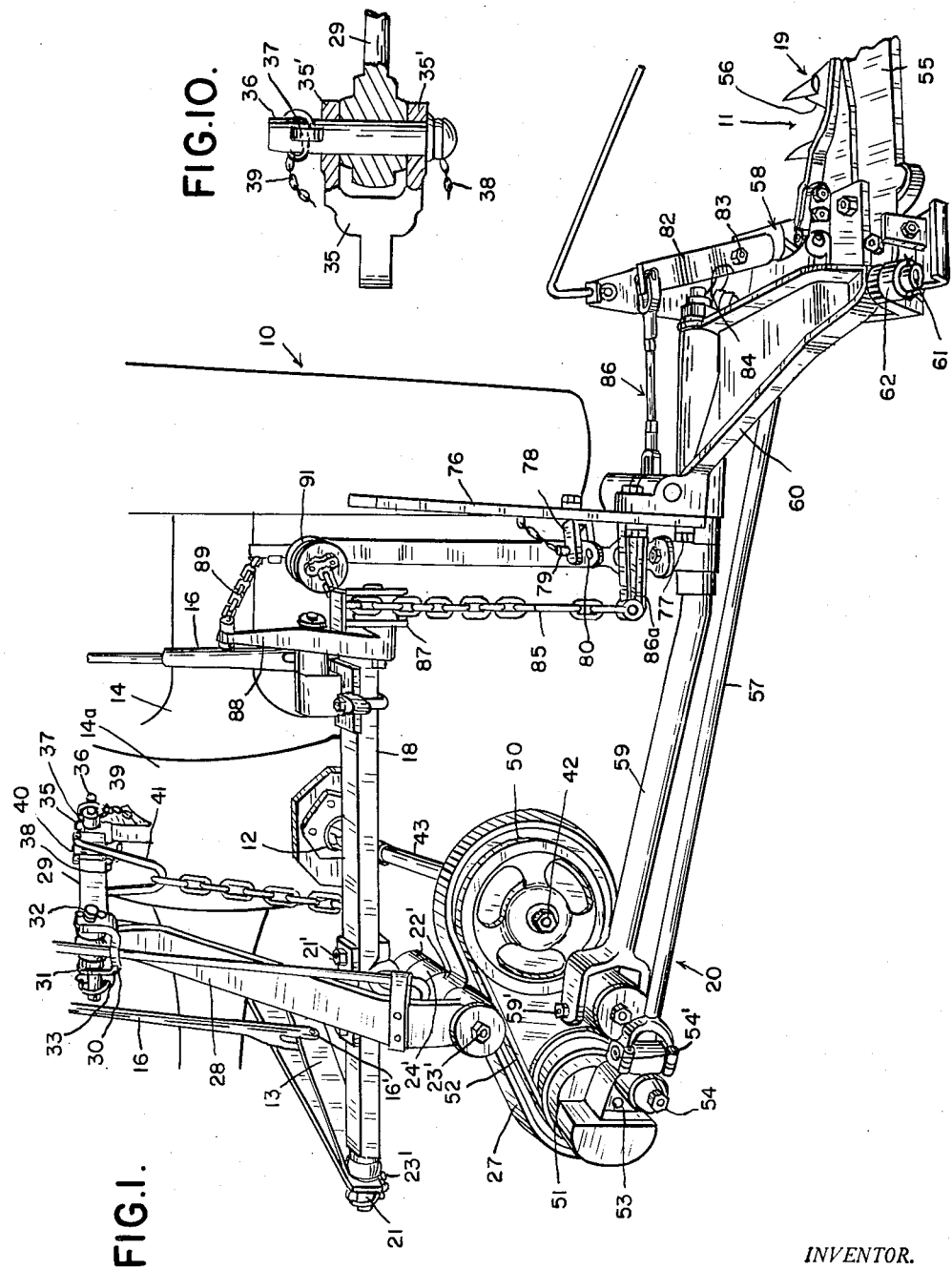
INVENTOR.
ARAM ABGARIAN
BY
Whittemore, Hulbert & Belknap
ATTORNEYS

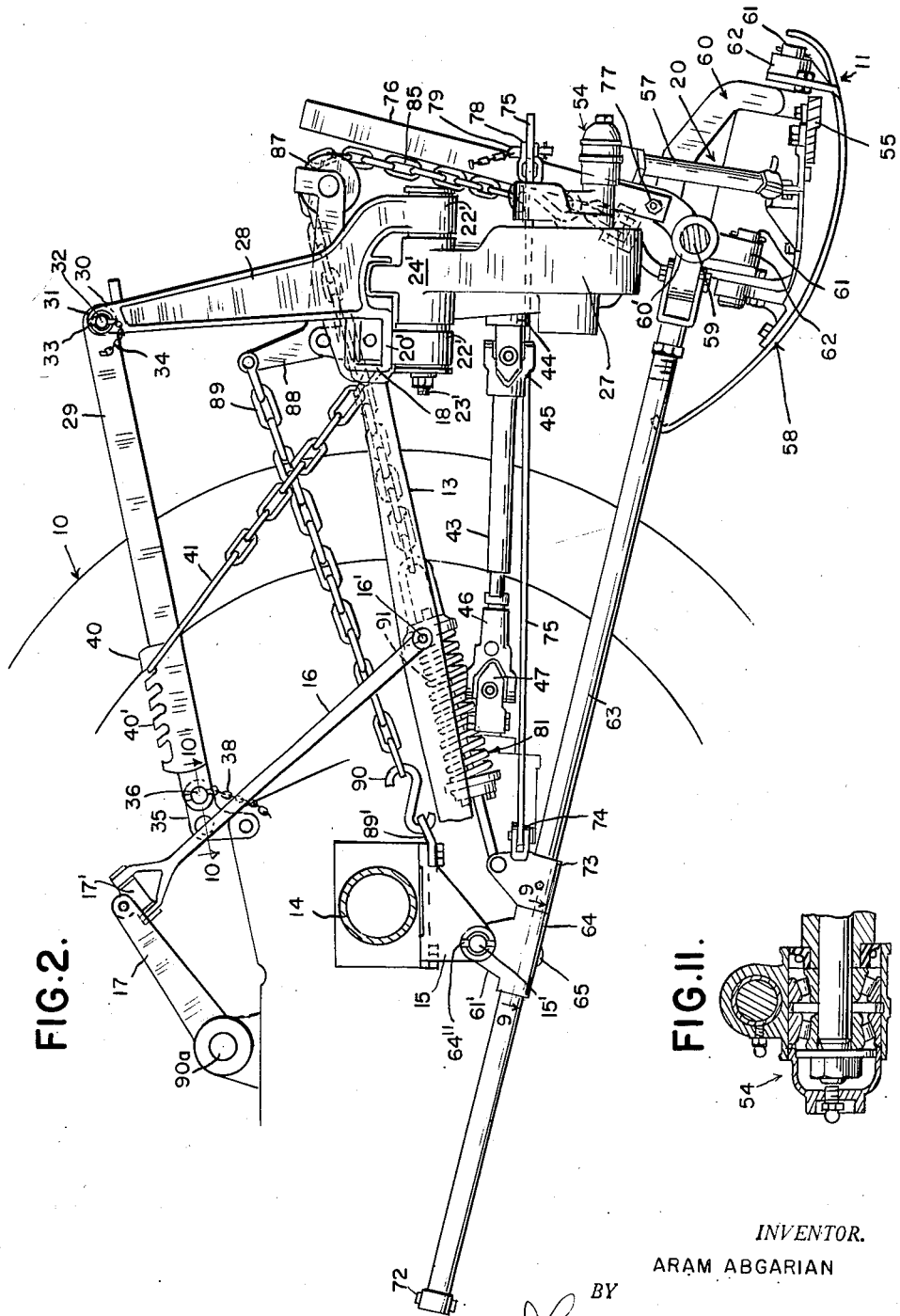

Dec. 25, 1951　　　　A. ABGARIAN　　　　2,580,267
　　　　　　　　　　MOWER MOUNTING
Filed April 29, 1946　　　　　　　　　　　　4 Sheets-Sheet 3
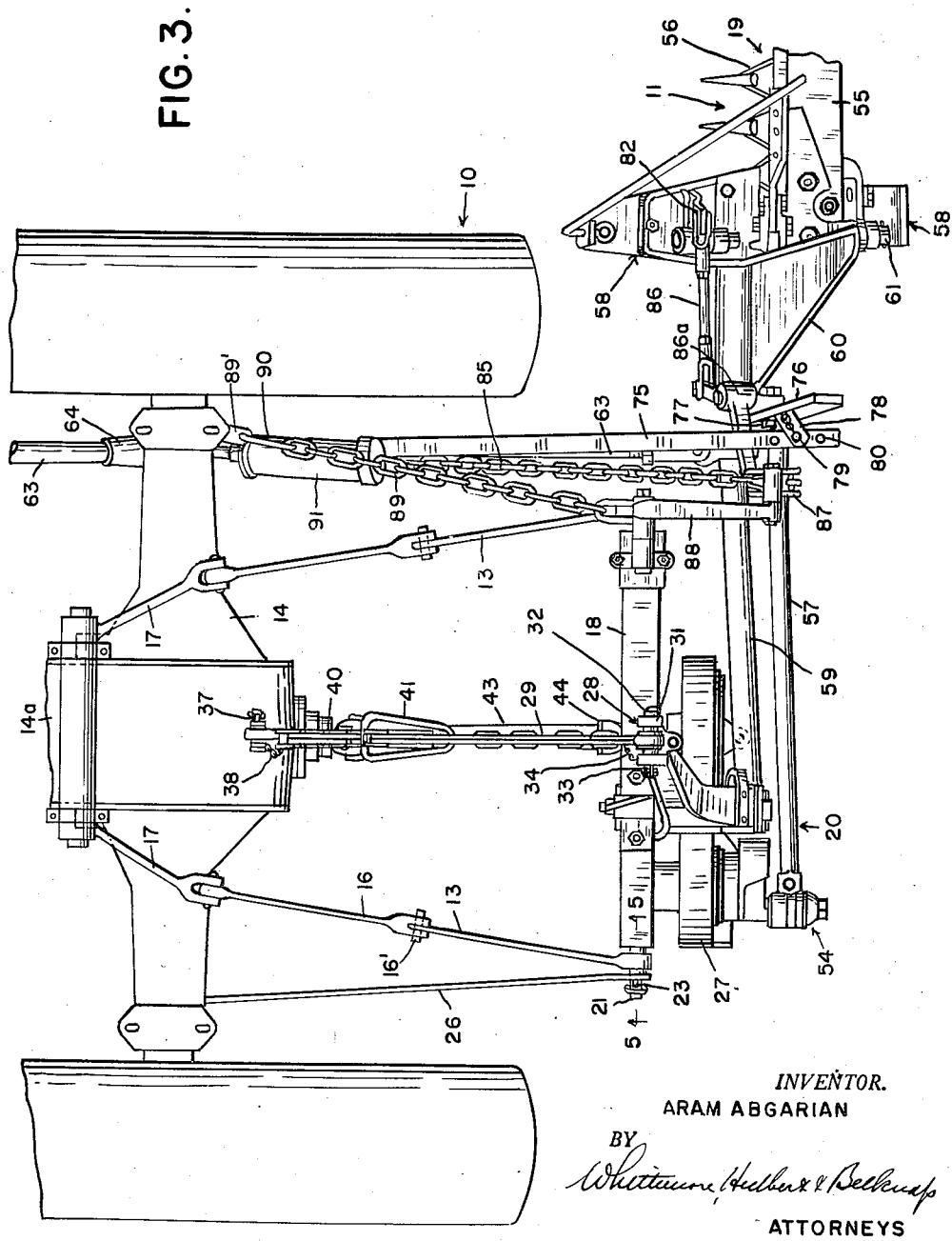
INVENTOR.
ARAM ABGARIAN
BY
ATTORNEYS Dec. 25, 1951  A. ABGARIAN  2,580,267
MOWER MOUNTING
Filed April 29, 1946  4 Sheets-Sheet 4
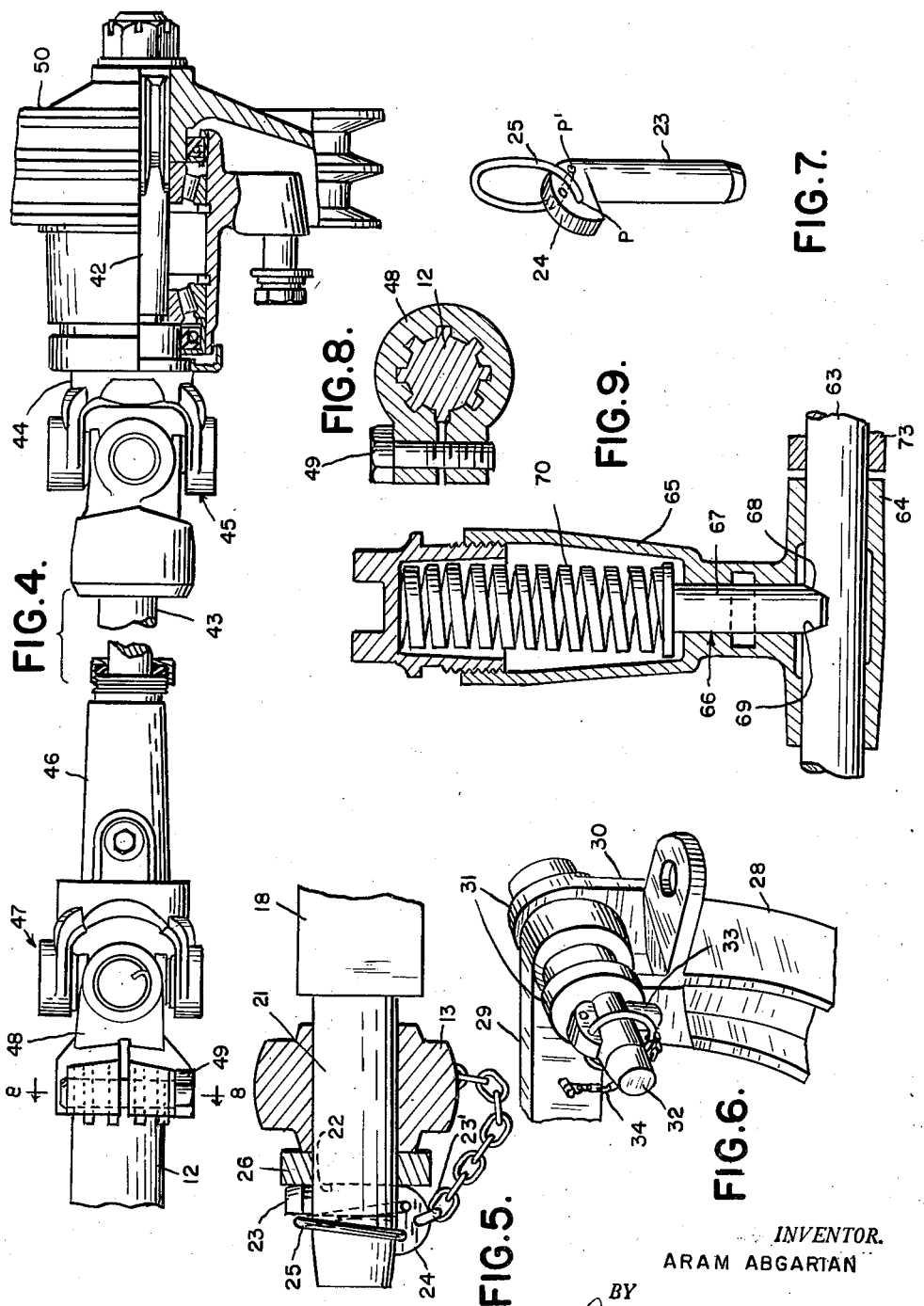
INVENTOR.
ARAM ABGARIAN
BY
Whittemore, Hulbert & Belknap
ATTORNEYS Patented Dec. 25, 1951

2,580,267

UNITED STATES PATENT OFFICE 2,580,267

MOWER MOUNTING

Aram Abgarian, Detroit, Mich., assignor to Detroit Harvester Company, Detroit, Mich., a corporation of Michigan Application April 29, 1946, Serial No. 665,767

6 Claims. (Cl. 56—25)

This invention relates generally to mowing machines and refers more particularly to improvements in mowing equipment of the type adapted to be attached to conventional tractors.

One of the objects of this invention is to provide a mowing machine composed of a relatively few simple parts capable of being quickly assembled with, and removed from, the tractor as a unit.

Another object of this invention is to provide quickly detachable connections between various parts of the mowing machine and tractor which are not only capable of being readily manipulated by unskilled operators or attendants, but in addition, serve to effectively hold the mowing machine against accidental displacement from the tractor during operation.

A further object of this invention is to provide a mowing machine having a drive shaft and having a readily detachable coupling for securing the drive shaft to the power take-off shaft forming a standard part of the tractor.

The foregoing as well as other objects will be made more apparent as this description proceeds, especially when considered in connection with the accompanying drawings, wherein:

Figure 1 is a fragmentary perspective view of a mowing machine embodying the features of this invention and showing the same as attached to the power operated lift arms of a conventional tractor;

Figure 2 is a side elevational view, partly in section, of the mowing machine shown in Figure 1;

Figure 3 is a plan view of the mowing machine shown in Figure 1;

Figure 4 is an enlarged fragmentary side elevational view of the mower drive shaft assembly;

Figure 5 is an enlarged sectional view taken substantially on the plane indicated by the line 5—5 of Figure 3;

Figure 6 is an enlarged detail perspective view showing the connection between the pedestal 28 and link 29;

Figure 7 is an enlarged detail perspective view of one of the removable pins employed in attaching the mowing machine to the tractor;

Figure 8 is an enlarged cross sectional view taken on the line 8—8 of Figure 4;

Figure 9 is an enlarged sectional view taken on the line 9—9 of Figure 2;

Figure 10 is an enlarged sectional view taken on the line 10—10 of Figure 2; and Figure 11 is an enlarged fragmentary sectional view through the housing for the eccentric.

Referring now more in detail to the drawings, it will be noted that the reference character 10 indicates a tractor and the numeral 11 designates a mowing machine attachable to the tractor in accordance with the present invention. The tractor is of conventional design having a power take-off shaft 12 and having a pair of supporting arms 13 extending rearwardly from the tractor at opposite sides of the power take-off shaft 12. The arms 13 respectively are pivotally connected at their forward ends to the usual pivot pins (not shown) that are provided on the rear axle housing 14 of the tractor adjacent opposite sides of the differential housing 14a of the tractor to enable swinging movement of the arms in substantially vertical planes. In accordance with conventional practice, the supporting arms 13 are operated by a pair of links 16 having their lower ends respectively pivotally connected by pins 16' to the supporting arms 13 intermediate the ends of the latter and having their upper ends pivotally connected by couplings 17' to power operated levers 17. The levers 17 are rigidly connected to a shaft 90a which in turn is connected to hydraulic mechanism (not shown) provided on the tractor.

Levers 17 and arms 13 are parts of the tractor with which the mower is associated. Power operated levers of this type are shown in Figure 1 of Ferguson Patent 2,118,180. The mowing machine 11 comprises a draw bar 18, a cutter bar assembly 19 and driving mechanism 20. The draw bar 18 extends transversely of the tractor between the rear ends of the supporting arms 13, and the opposite ends of the draw bar are respectively pivotally connected to the supporting arms 13. The pivotal connections between opposite ends of the draw bar 18 and the rear ends of the arms 13 are identical in construction. Consequently, a detailed description of the connection between one end of the draw bar and adjacent supporting arm 13 will suffice for both ends. As shown in Figure 5 of the drawings, a cylindrical portion in the form of a pintle 21 extends from the end of the draw bar 18 in the direction of length of the latter, and passes through an opening in the rear end of the adjacent supporting bar 13. An opening 22 is formed in the cylindrical portion 21 adjacent the outer end thereof, and a pin 23 is engaged in the opening to hold the bar 13 in assembled relation with the draw bar 18. The pin 23 has a head portion 24 at one end, and a spring 25 in the form of a loop is pivoted on the head portion. The arrangement is such that after the pin is engaged with the cylindrical portion 21 of the draw bar, the spring 25 may be swung to a position wherein it receives the cylindrical portion 21 and prevents accidental disengagement of the pin 23 from the cylindrical portion 21. As shown particularly in Figure 7 of the drawings, the free ends of the spring 25 pivotally engage the head 24 on the pin at laterally spaced points P and P', so that the spring 25 is placed under sufficient tension to hold the same in place. As shown in Figure 3 of the drawings, the pin 23 also serves to connect the rear end of a stabilizer link 26 to the draw bar 18. The forward end of the stabilizer link is pivoted to the axle housing in any suitable manner not shown herein.

As previously stated, the supporting arm 13 at the opposite side of the tractor is connected to the draw bar in a similar manner and corresponding parts of this connection are indicated by the same reference characters. Thus it will be noted that the draw bar 18 may be readily detached from the rear ends of the supporting arms 13 by merely removing the pins 23 and disengaging the arms from the cylindrical portions 21 at opposite ends of the draw bar. The stabilizing link 26 is removed from the draw bar at the same time the adjacent supporting arm 13 is disengaged from the draw bar. When the pins 23 are disengaged, they are prevented from being lost by chains 23', which permanently connect the heads 24 of the pins to the supporting arms 13.

The cutter bar assembly 19 and the driving mechanism 20 are supported on the draw bar 18, so as to be removable therewith as a unit. Referring first to the driving mechanism 20, it will be noted that this mechanism comprises a frame or housing 27 suspended from the draw bar 18 by a pedestal 28. The pedestal 28 is formed adjacent the lower end with a portion 20' which is rectangular in cross section and receives the draw bar 18. The portion 20' is clamped in place on the draw bar 18 by fastener elements 21', shown in Figure 1 of the drawings. The pedestal also has a part which extends below the draw bar 18 and this part is formed with spaced bushings 22' which form a support for the opposite ends of a pivot pin 23'. Supported on the pivot pin 23' between the bushings 22' is a bushing 24' which is fixed to the top of the housing 27 for the driving mechanism 20. Thus the housing 27 is pivotally supported on the draw bar 18 by the pedestal 28. In addition the pedestal has a portion extending upwardly from the draw bar and connected to the tractor housing 14 by a link 29. In detail, the upper end of the pedestal 28 has a bifurcated portion 30 for receiving the rear end of a link 29 therebetween. The furcations 31 of the bifurcated portion 30 are formed with aligned openings therethrough for receiving a head pin 32. The pin 32 also extends freely through an opening in the rear end of the link 29, and serves to pivotally connect the link 29 to the pedestal 28. The opposite end of the pin 32 is apertured to receive a pin 33 that is similar to the pin 23 previously described and is permanently attached to the link 29 by means of a chain 34. The forward end of the link 29 is pivotally connected to a bracket 35 on the rear axle housing 14 by a pin 36. As shown in Figure 10, the bracket 35 has a bifurcated portion straddling the forward end of the link 29, and the pin 36 extends through aligned openings in the furcations 35' of the bracket and in the link 29. A retaining pin 37 is adapted to engage an opening in the free end of the pin 36, and this retaining pin 37 is identical to the pin 23. The pin 36 is permanently attached to the axle housing by a chain 38, and the retaining pin 37 is also permanently attached to the housing by a chain 39, so that the pins will not become lost when disengaged. The link 29 forms a support for a rack 40 having a series of teeth 40' spaced from each other in the direction of the link for selectively engaging the upper end of a chain 41 having its lower end secured to the draw bar 18 intermediate the ends of the latter. The arrangement is such as to permit varying the elevation of the draw bar and associated cutter bar assembly 19 relative to the ground.

It follows from the foregoing that the link 29 may be readily disconnected from either or both the tractor 10 or the pedestal 28. In most cases where it is desirable to detach the mowing machine from the tractor, it is preferred to disconnect the rear end of the link 29 from the pedestal, so as to leave the link on the tractor. It will, of couse, be understood that after the rear end of the link is disconnected from the upper end of the pedestal 28, the chain 41 is merely disengaged from the rack and is slipped over the rear end of the link 29. In other words, the chain 41 is removed with the draw bar.

The housing of the driving mechanism rotatably supports a stub shaft 42, and the front end of said stub shaft has a head 44 connected by a universal joint 45 to the rear end of a drive shaft 43. The front end of the drive shaft 43 is splined within a sleeve 46 which is detachably connected by means of a universal joint 47 to a longitudinally split sleeve 48 splined upon the power take-off shaft 12. A bolt 49 is provided for clamping the sleeve 48 in operative engagement with the power take-off shaft 12 in the manner clearly shown in Figure 8 of the drawings. It follows from the foregoing that the driving mechanism 20 of the mowing machine may be readily disengaged from the power take-off shaft 12 by loosening bolt 49 and disconnecting the sleeve 48 from the drive shaft 12.

A pulley 50 is secured to the stub shaft 42 and is connected to a second pulley 51 by a belt 52. The second pulley 51 is secured to a driven shaft 53 and carries an eccentric pin 54 having its axis laterally offset from the shaft 53. The eccentric pin 54 is connected to the cutter bar assembly 19 for operating the latter.

The cutter bar assembly 19 comprises a cutter bar 55 and a knife 56 supported on the bar for reciprocation lengthwise of the bar. In operation the cutter bar assembly 19 projects laterally outwardly from one side of the tractor at the rear end thereof, and the inner end of the knife 56 is connected to the outer end of a pitman rod 57 having the inner end connected to the eccentric pin 54 by a pin 54'. The inner end of the cutter bar 55 is supported on a shoe 58, and the shoe is connected to the outer end of a drag bar 59 which has its inner end supported on the housing 27 by a vertical pin 59'.

The connection between the drag bar and shoe comprises a hinge bracket 60 journalled on the outer end of the drag bar for rocking movement about the axis of the drag bar. The hinge bracket 60 is also provided with aligned pins 61 having their common axis extending perpendicular to the axis of rocking movement of the hinge bracket and engageable in aligned bearings 62 formed on the shoe 58 to enable vertical swinging movement of the cutter bar assembly from a position substantially parallel to the ground to an upright or inoperative position.

As stated above the inner end of the pitman rod 57 is connected to the eccentric 54 by the pin 54', and the inner end of the drag bar is connected to the housing 27 by the vertical pin 59'.

As a result the cutter bar assembly may be swung rearwardly in the event it contacts obstructions during operation of the mower. The cutter bar assembly is normally restrained from rearward swinging movement by a pull bar 63 having its rear end rotatably supported on the drag bar 59 adjacent the hinge bracket 60 by a coupling 60' and having its forward end portion slidably mounted in a sleeve 64. The sleeve 64 has an upstanding web portion 61' which is removably mounted on a laterally projecting pivot pin 15' of a bracket 15 that in turn is secured to the rear axle housing 14 of the tractor, and is provided with a lateral extension 65 for supporting suitable latch mechanism 66. A removable pin 64" extends through the pivot pin 15' adjacent the free end thereof to prevent accidental displacement of said web portion 61' therefrom.

The latch mechanism 66 comprises a plunger 67 supported in the extension for sliding movement perpendicular to the pull bar 63 and having a cam portion 68 engageable in a correspondingly shaped notch 69 formed in the pull bar. The location of the notch 69 in the pull bar is predetermined, so that when the latch plunger is in engagement therewith, the cutter bar assembly is held in its operative position. Disengagement of the latch plunger from the pull bar is resisted by a spring 70 having one end abutting the plunger, and having the opposite end engaging an adjustable cap at the outer end of the extension. The force exerted on the latch plunger 67 by the spring is predetermined to hold the cutter bar assembly in its operative position during normal mowing operations, and to permit rearward swinging movement of the cutter bar assembly in the event the latter contacts rocks, stumps or other ground obstructions. The extent of rearward swinging movement of the cutter bar assembly is determined by engagement of a stop 72 on the front end of the pull bar with the sleeve 64.

A second sleeve 73 is secured to the pull bar 63 at the rear side of the sleeve 64, and is formed with ears 74 to which the front end of a link 75 is pivoted. The rear end of the link 75 is connected to a tilt lever 76 intermediate the ends of the latter, and the lower end of the tilt lever is rigidly secured to the hinge bracket 60 by fastener elements 77. As shown, particularly in Figure 1 of the drawings, a bifurcated bracket 78 is secured to the inner side of the tilt lever 76, and is formed with aligned openings through the furcations thereof for receiving a pin 79. The pin 79 also selectively engages in longitudinally spaced openings 80 formed in the rear end of the link 75 to hold the tilt lever 76 and, accordingly, the cutter bar assembly 19 in different tilted positions.

The sleeve 73 also forms anchorage means for counterbalancing means 81 provided to assist in swinging the cutter bar assembly 19 to its upright position about the axis of the pins 61. The counterbalancing means 81 comprises a lever 82 having the lower end pivotally connected to the shoe by a pin 83 and having the inner edge abutting a shoulder 84 formed on the shoe above the axis of the pivot pins 61. Thus, inward movement of the upper end of the lever 82 tends to rock the shoe and cutter bar assembly in an upward direction. The upper end of the lever 82 is connected by link 86 and bell crank lever 86a to the lower end of a chain 85, and the chain extends upwardly over a pulley or guide 87. The guide 87 is connected to one arm of a bell crank lever 88 having the other arm connected to the rear end of a chain 89. The forward end of the chain 89 is provided with a hook 90 which is removably connected to an arm 89' bolted to the bracket 15. The chain 85 extends forwardly from the guide 87 and is connected at its forward end to a spring unit 91 that in turn is connected to the sleeve 73 and is arranged to exert a forward pull on the chain 85. This forward pull is transmitted through the link 86 to the upper end of the lever 82, and tends to rock the cutter bar assembly upwardly about the hinge pins 61. It is important to note at this time that the chain 85 also provides a connection between the draw bar 18 and the cutter bar assembly and cooperates with the chain 89 to assist in raising the cutter bar assembly upon elevating the draw bar.

The specific construction of the counterbalancing means 81 and the tilting mechanism for the cutter bar assembly forms no part of the present invention. However, it is important to note that both of the above units are anchored to the pull bar 63 by means of the sleeve 73. Thus, it is not necessary to detach or interfere with either of the above units when the mowing machine is removed from the tractor. Actually the only part of the counterbalancing mechanism that need be detached from the tractor is the chain 89, and this may be accomplished by merely disengaging the hook 90 from the arm 89'.

It will be noted from the foregoing that the mowing machine may be detached from the tractor 10 by first loosening the clamping bolt 49 to disengage the sleeve 48 of the universal coupling 47 from the power take-off shaft 12; second, removing the chain 41 from the rack 40 and allowing the mower assembly to drop to the ground; third, removing the pins 23 and slipping the supporting arms 13, together with the stabilizing link 26, from the ends of the draw bar 18; fourth, removing the pins 32 and 33 to disconnect the rear end of the link 29 from the upper end of the pedestal 28; fifth, removing the pin 64" and detaching the sleeve 64 from the adjacent bracket 64'; and sixth, disengaging the hook 90 at the rear end of the chain 89 from the arm 89'. By following the above procedure, the mowing machine may be readily removed from the tractor without the necessity of dismantling any of the parts of the mowing equipment. It is pointed out that the sequence of steps three, four, five and six is of no particular importance and may be varied as desired.

What I claim as my invention is:

1. In a tractor having a frame, a pair of laterally spaced power operated lift arms adjacent the rear of said frame, a power take-off shaft extending rearwardly from said frame, and a mower comprising a draw bar, a support housing secured to said draw bar intermediate its ends, a drag bar pivoted at one end to said support housing for vertical and rearward swinging from a normal transverse operating position, a cutter bar pivoted to the other end of said drag bar for vertical swinging and angular adjustment about its longitudinal axis relative to said drag bar, a knife reciprocable on said cutter bar, drive means in said support housing, transmission means connecting said drive means and knife, a pedestal extending upwardly from said support housing, and a pull bar connected at its rear end to said drag bar and having a sleeve slidable thereon, said sleeve including a releasable latch engageable with said pull bar; quick detachable structure providing for attachment and removal of the mower to and from the tractor arranged to provide a complete mower assembly removable as a unit from the tractor, said structure comprising a drive shaft connected to the drive means in said support housing and a releasable coupling at the end of said drive shaft for engagement with the power take-off shaft of the tractor, releasable coupling means for connecting the ends of the lift arms to the ends of said draw bar, releasable coupling means for connecting said sleeve to the underside of the tractor frame, and a releasable link for connecting said pedestal to the frame of the tractor.

2. In a tractor having a frame, a pair of laterally spaced power operated lift arms adjacent the rear of said frame, a power take-off shaft extending rearwardly from said frame, and a mower comprising a draw bar, a support housing secured to said draw bar intermediate its ends, a drag bar pivoted at one end to said support housing for vertical and rearward swinging from a normal transverse operating position, a cutter bar pivoted to the other end of said drag bar for vertical swinging and angular adjustment about its longitudinal axis relative to said drag bar, counterbalance mechanism including a bell crank lever pivoted to said drag bar, a knife reciprocable on said cutter bar, drive means in said support housing, transmission means connecting said drive means and knife, a pedestal extending upwardly from said support housing, and a pull bar connected at its rear end to said drag bar and having a sleeve slidable thereon, said sleeve including a releasable latch engageable with said pull bar: quick detachable structure providing for attachment and removal of the mower to and from the tractor arranged to provide a complete mower assembly removable as a unit from the tractor, said structure comprising a drive shaft connected to the drive means in said support housing and a releasable coupling at the end of said drive shaft for engagement with the power take-off shaft of the tractor, releasable coupling means for connecting the ends of the lift arms to the ends of said draw bar, releasable coupling means for connecting said sleeve to the underside of the tractor frame, a flexible element connected to said bell crank lever and including a detachable connection for engagement with a part of said tractor, and a releasable link for connecting said pedestal to the frame of the tractor.

3. In a mower comprising a frame, a pair of laterally spaced power lift arms on said frame, a power take-off shaft extending rearwardly from said frame, a mower comprising a draw bar, a support housing on said draw bar, cutting mechanism pivotally connected to said support housing, a pull bar connected to said cutting mechanism including a sleeve slidable on said pull bar and having releasable latch mechanism normally preventing relative sliding between said pull bar and sleeve: quick detachable mounting and coupling structure for connecting said mower to said tractor, said structure comprising releasable mounting means for coupling the ends of said draw bar to the ends of said lift arms, a drive shaft for operating the cutting mechanism extending forwardly from said support housing and having releasable means at its forward end for engagement with said power take-off shaft, and releasable means for connecting said sleeve to the underside of said frame.

4. In a mower comprising a frame, a pair of laterally spaced power lift arms on said frame, a power take-off shaft extending rearwardly from said frame, a mower comprising a draw bar, a support housing on said draw bar, a pedestal extending upwardly from said support housing, cutting mechanism pivotally connected to said support housing, a pull bar connected to said cutting mechanism including a sleeve slidable on said pull bar and having releasable latch mechanism normally preventing relative sliding between said pull bar and sleeve: quick detachable mounting and coupling structure for connecting said mower to said tractor, said structure comprising releasable mounting means for coupling the ends of said draw bar to the ends of said lift arms, a link extending forwardly from the upper end of said pedestal and having releasable means at its forward end for connection to the frame of the tractor, a drive shaft for operating the cutting mechanism extending forwardly from said support housing and having releasable means at its forward end for engagement with said power take-off shaft, and releasable means for connecting said sleeve to the underside of said frame.

5. In a mower comprising a frame, a pair of laterally spaced power lift arms on said frame, a power take-off shaft extending rearwardly from said frame, a mower comprising a draw bar, a support housing on said draw bar, a pedestal extending upwardly from said support housing, cutting mechanism pivotally connected to said support housing, counterbalance mechanism comprising a lever member on said draw bar, a pull bar connected to said cutting mechanism including a sleeve slidable on said pull bar and having releasable latch mechanism normally preventing relative sliding between said pull bar and sleeve: quick detachable mounting and coupling structure for connecting said mower to said tractor, said structure comprising releasable mounting means for coupling the ends of said draw bar to the ends of said lift arms, a link extending forwardly from the upper end of said pedestal and having releasable means at its forward end for connection to the frame of the tractor, a drive shaft for operating the cutting mechanism extending forwardly from said support housing and having releasable means at its forward end for engagement with said power take-off shaft, a flexible member extending forwardly from said lever member and having releasable means at its forward end for connection to the frame of the tractor, and releasable means for connecting said sleeve to the underside of said frame.

6. In a tractor having a frame, a pair of power operated lift arms on said frame adjacent the rear end thereof, a power take-off shaft extending rearwardly from said frame, and a mower assembly comprising a draw bar, a pedestal extending upwardly from said draw bar, a drag bar pivoted at one end to said draw bar for vertical and rearward swinging from a normal transverse operating position, a pull bar secured at its rear end to said drag bar, a sleeve slidable on said pull bar, a releasable latch between said sleeve and pull bar, cutting mechanism including a cutter bar pivoted to the other end of said drag bar, a knife reciprocable on said cutter bar and drive means for reciprocating said knife: quick detachable means for connecting the ends of said draw bar to the ends of said lift arms, a releasable coupling for connecting said drive means to said power take-off shaft, a link extending forwardly from said pedestal and having a releasable coupling for attachment to said frame, and releasable means for connecting said sleeve to the underside of said frame.

ARAM ABGARIAN.

REFERENCES CITED

The following references are of record in the file of this patent:

UNITED STATES PATENTS

| Number | Name | Date |
|---|---|---|
| 1,915,548 | Paul | June 27, 1933 |
| 1,946,543 | Paul | Feb. 13, 1934 |
| 2,172,987 | Mott | Sept. 12, 1939 |
| 2,176,992 | Crumb et al. | Oct. 24, 1939 |
| 2,314,215 | Hilblom | Mar. 16, 1943 |
| 2,331,863 | Schroeppel | Oct. 12, 1943 |
| 2,335,510 | Hansen | Nov. 30, 1943 |
| 2,354,710 | Simpson et al. | Aug. 1, 1944 |
| 2,502,805 | Spurlin | Apr. 4, 1950 |